United States Patent [19]

Radecki et al.

[11] Patent Number: 4,676,819
[45] Date of Patent: Jun. 30, 1987

[54] ABLATION MELTING WITH COMPOSITE LINING

[75] Inventors: Francis A. Radecki; Gary N. Hughes, both of Pittsburgh, Pa.; Henry C. Goode, Decatur, Ill.

[73] Assignee: PPG Industries, Inc., Pittsburgh, Pa.

[21] Appl. No.: 827,041

[22] Filed: Feb. 7, 1986

[51] Int. Cl.$^4$ .............................................. C03B 5/14
[52] U.S. Cl. ........................................ 65/135; 65/27; 65/136; 65/335; 65/347
[58] Field of Search .................. 65/27, 335, 347, 135, 65/136

[56] References Cited

U.S. PATENT DOCUMENTS 1,831,619 11/1931 Allen .
1,889,511 11/1932 Amsler .
2,006,947 7/1935 Furguson .
2,593,197 4/1952 Rough .
2,834,157 5/1958 Bowes .
3,689,679 9/1972 Niwa et al. .
3,917,479 11/1975 Sayce et al. .
4,061,487 12/1977 Kiyonaga .
4,381,934 5/1983 Kunkle et al. .

Primary Examiner—Arthur Kellogg
Attorney, Agent, or Firm—Dennis G. Millman

[57] ABSTRACT

In a method and apparatus for liquefying material such as glass batch, primary thermal protection for the vessel is provided by a lining of the batch material, with secondary protection being provided by a partial refractory lining on the interior of the vessel in regions where the primary protection is irregular.

16 Claims, 2 Drawing Figures

ABLATION MELTING WITH COMPOSITE LINING

BACKGROUND OF THE INVENTION

In U.S. Pat. No. 4,381,934 there is disclosed a method for liquefying materials such as glass batch or the like, wherein a lining of pulverulent material such as the batch material itself acts as insulation to protect the vessel side walls from the intense temperatures within the vessel. In preferred embodiments, the lining encircles a central cavity of the vessel and the lining is maintained by permitting liquefied material to flow freely from the vessel and by feeding relatively cool material onto the lining. An advantage of such an arrangement is that high temperatures can be provided for liquefying the batch without requiring extensive contact of the product stream with contaminating refractory materials and without requiring extensive heat loss by forced cooling of the vessel walls.

Melting of a layer on a refractory wall has been known in the prior art, such as disclosed in U.S. Pat. Nos. 1,831,619; 1,889,511; 2,006,947; and 2,593,197. These arrangements have the drawback of placing a relatively small volume of throughput material in contact with a relatively large area of refractory material, thereby having a substantial potential for contaminating the throughput due to refractory erosion.

Prior art examples of water cooled melting vessels are disclosed in U.S. Pat. Nos. 2,834,157 (Bowes), 3,917,479 (Sayce et al.), and 4,061,487 (Kiyonaga). Each of these employs water cooling as the primary agent to preserve substantially the entire side wall portions of the vessel, with the result that a large amount of energy is wasted through the vessel walls due to the large temperature gradient established between the cooling fluid and the molten material within the vessel.

The liquefying method of the aforesaid U.S. Pat. No. 4,381,934 is capable of continuous operation over extended periods of time without the use of forced external cooling while avoiding significant thermal deterioration of the vessel side walls. Although the lining of batch material may at times erode irregularly, the system is generally self-repairing due to the feeding of additional batch material to the vessel. However, disruptions in the steady state conditions within the liquefaction vessel may occasionally result in reduction in thickness of portions of the lining, particularly in the upper portion of the vessel, to the extent that portions of the vessel side walls may be exposed to temperatures which, if sustained for a sufficient period of time, could lead to distortion or other thermal deterioration of the vessel. Instability of the batch wall thickness can occur, for example, during startup or when changing the batch feed rate or the heating rate. Also, during normal operation the batch lining at a middle elevation may erode more rapidly, thereby undercutting the lining above, and eventually causing a sudden collapse of lining from an upper region. Such aberrations do not present a significant problem if they are short in duration, but if they are sustained or occur frequently, it would be desirable to provide thermal protection for the vessel. Thermal distortion of the vessel is particularly a problem because of the dynamic instability it produces when the vessel is rotated in accordance with the preferred embodiments of the liquefaction process.

U.S. Pat. No. 3,689,679 (Niwa et al.) discloses a silica melting process of a somewhat different type in which portions of the vessel are cooled. As depicted in the patent, cooling is provided on a majority of the side wall area in the region of active melting. The patent does not involve liquefying at the surface of a lining as in the present invention.

SUMMARY OF THE INVENTION

In the present invention, batch materials for glass or the like are liquefied on a surface of a cavity within a vessel for which the primary thermal protection is provided by an insulating lining of pulverulent material compatible with the material being liquefied, preferably the batch material itself. To protect the vessel side walls against undue thermal deterioration in the event that the lining thickness is excessively reduced during irregular operation, an upper portion of the vessel is provided with a refractory lining. Contact between the refractory and the liquefying material is insubstantial because of the relatively small area of refractory that ever becomes exposed and because in most circumstances the refractory would be exposed only intermittently. The refractory lining serves to thermally stabilize the vessel when the pulverulent lining is reduced beyond a minimum thickness, and contact occurs only at times and in areas where the pulverulent lining is completely absent. Operating parameters are adjusted to restore the pulverulent lining to cover the refractory, thereby minimizing the exposure of the refractory.

Optionally, additional assurance of thermal stability of the vessel during irregular operation can be provided by cooling the upper portion of the vessel in the region of the refractory lining. Because of the insulating effect of the refractory lining, very little heat is extracted from the liquefaction process by the cooling. When the pulverulent layer is intact, even less energy is lost by cooling. Furthermore, the cooling effects significant heat transfer only intermittently and only in a limited area. The cooling preferably comprises water spray on the exterior of the vessel.

THE DRAWINGS

DETAILED DESCRIPTION

Figure 1:
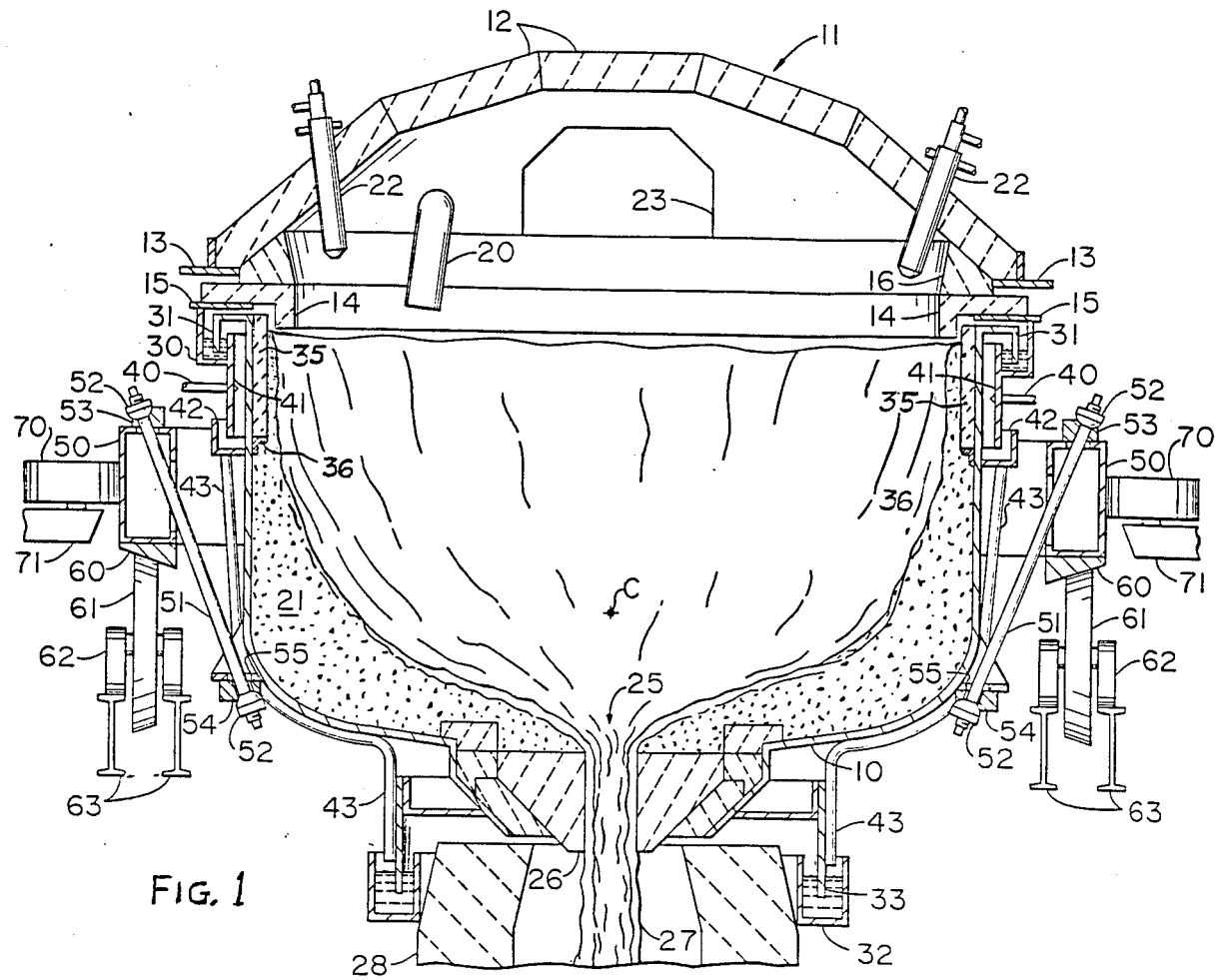
FIG. 1 is a vertical cross-sectional view of a preferred embodiment of a rotating liquefaction vessel including an upper refractory lining with optional cooling means in accordance with the present invention.

Referring to the specific embodiment shown in FIG. 1, the basic structure of the liquefying vessel is a drum 10 which may be fabricated of steel and which has a generally cylindrical side configuration, a generally open top, and a bottom portion that is closed except for a drain outlet. The drum 10 is mounted for rotation about a vertical axis in a manner to be described in detail hereinbelow. A substantially enclosed cavity is formed within the liquefying vessel by means of a lid structure generally designated as 11 which is provided with stationary support. The lid 11 is preferably constructed of refractory ceramic material and may take a variety of forms as would be known to those of skill in the refractory furnace construction art. The preferred arrangement depicted in the figure is an upwardly domed, sprung arch construction fabricated from a plurality of refractory blocks 12. In the typical arch construction shown, the arch blocks rest on a peripheral support structure 13. Plate blocks 14 may extend slightly below the upper rim of the drum 10 and are supported by stationary support plate 15. Seal blocks 16 may be provided to close the gap between the arch blocks 12 and the plate blocks 14. It should be understood that monolithic and flat suspended designs could be employed for the lid.

Batch materials, preferably in a pulverulent state, may be fed into the cavity of the heating vessel by means of a water cooled chute 20. A layer 21 of the batch material is retained on the interior walls of the drum 10 to act as an insulating lining. As the drum is rotating, the feed chute 20 directs batch material onto upper portions of the lining 21. Heating for liquefying the batch material may be provided by one or more burners 22 extending through the lid 11. Preferably a plurality of burners 22 are arranged around the perimeter of the lid so as to direct their flames toward a wide area of the lining 21. The burners are preferably water cooled to protect them from the harsh environment within the vessel. Exhaust gases escape from the vessel through an opening 23 in lid 11. As batch material on the surface of lining 21 liquefies it flows down the sloped lining to a central drain opening 25 at the bottom of the vessel. The opening 25 may be fitted with a refractory ceramic bushing 26. A stream of liquefied material 27 falls freely from the vessel into a stationary receptacle 28 and may thereafter be subjected to additional treatment to complete the melting process. Because the liquefied material is permitted to flow freely from the surface of the lining 21, it is in an incompletely melted state as it passes from the drum 10. Liquefied glass batch at that point usually includes a large amount of gaseous products of reaction and may also include some unmelted particles.

At the interface between the upper rim of the rotating drum 10 and the stationary lid 11 an atmosphere seal may be provided comprised of a stationary, circular, water-containing trough and a circular flange member 31 extending downwardly into the trough from the rotating drum. A similar stationary water trough 32 and flange 33 extending downwardly from the rotating drum may be provided at the lower end of the drum.

One embodiment of protective refractory lining in accordance with the present invention is depicted in FIG. 1 wherein a refractory lining 35 is provided around the inside upper periphery of the drum 10. The extent of the lining 35 is generally required to be only a minor portion of the area of the drum, the pulverulent layer 21 serving as the primary protective lining on the majority of the drum surface. Even in the area provided, contact between the refractory lining 35 and the liquefying material occurs only intermittently, on those occasions when irregular conditions result in depletion of the upper portion of the pulverulent lining 21. By adjusting the feed rate and/or firing rate the pulverulent lining is restored to substantially cover the refractory 35 in the normal mode of operation. Because of the paraboloid taper of the pulverulent lining 21, the upper portion of the lining is thinner, and therefore it is a minor, upper region of the vessel that is susceptible to exposure and benefits from the refractory lining. The lower portion of the pulverulent lining is thicker and more stable, and although there may be no detriment to extending the refractory lining to a major portion of the sides of the drum, the lower portion would remain insulated beneath the pulverulent layer 21 and would would have little or no function. But if desired for constructional convenience, the refractory lining could be applied to the entire drum.

Figure 2:
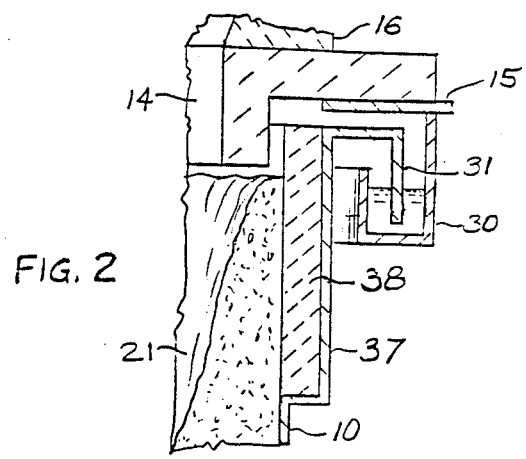
FIG. 2 is an enlarged cross-sectional view of an upper portion of a liquefaction vessel showing a preferred refractory lining construction.

Refractory lining 35 is shown supported on a ring or tabs 36, for example. Preferably, the refractory is a castable cement type that can be poured and cured in place with the aid of suitable forms. Metallic anchors (not shown) welded to the interior of the drum 10 may also serve to affix the cast refractory to the drum. A preferred arrangement for mounting a refractory lining is shown in FIG. 2, where an enlarged portion 37 of the drum 10 is provided to create a step on which refractory lining 38 is carried. Refractory cement cast around anchors is preferred in this embodiment as well. The thickness of the refractory lining 35 or 38 is sufficient to thermally insulate the metallic drum from the effects of the heat within the drum to prevent distortion of the drum during a period of irregular operation. The insulating value needed will depend upon the particular temperatures and structure involved. By way of example, silica cement at a thickness of five centimeters has been found satisfactory in the embodiment described.

As shown in FIG. 1, the refractory lining may be combined with exterior forced cooling to provide an extra degree of assurance of geometric stability of the drum 10. The cooling may be directed to substantially the same area to which the refractory lining is applied and serves to prevent the metallic drum from overheating if the refractory fails to provide sufficient insulation. Various arrangements could be employed to provide forced cooling to the upper portion of the drum 10. Tha coolant could be liquid (e.g., water) or gaseous (e.g., air). In the example shown, a stream of water is sprayed against the exterior of the upper portion of the drum. The water spray may be supplied with water by way of conduits 40, and the spray may be confined to the space closely adjacent to the drum by means of a spray shield 41. Spent water may be collected in a circular trough 42 and drained by way of conduits 43 that extend down along the slides of and rotate with the drum 10. Discharge of water from the conduits 43 may conveniently be provided into the water trough 32 of the bottom atmosphere seal.

As with the refractory lining, the external cooling need be applied only to the limited area of the side wall most prone to failure of the inner lining. In most cases, this would be a minor, upper portion of the drum corresponding to less than half of the height of the drum. The inner lining 21 normally serves as the primary thermal protection for the majority of the area of the drum side walls, and the refractory lining serves as the secondary protection. Applying external cooling to a portion of the drum that is protected by the refractory lining will extract very little thermal energy from the heating process being carried out within the drum, and even less when the pulverulent lining is present. Therefore, the cooled area may be larger than necessary with little or no loss of thermal efficiency. A layer of pulverulent glass batch material on the order of at least 2 centimeters thick has been found to be an effective insulator, and even at smaller thicknesses very little heat transfer occurs through the batch layer. The cooling could be activated only when needed, but there can be some advantage to continuing the flow of coolant because little heat transfer occurs, and maintaining the exterior of the vessel at the coolant temperature can avoid thermal shock when cooling is resumed.

The base on which the drum 10 is rotatably supported and driven is a support table 50 which, as shown in FIG. 1 may be configured as a hollow ring of generally rectangular cross-section. The support ring 50 encircles the drum and is spaced therefrom. The link means for connecting the support ring 50 to the drum 10 in this embodiment comprise a plurality of support rods 51. The number and size of the rods 51 are inversely related and depend upon the weight of a particular drum when fully loaded. Three rods could theoretically support the drum, but the use of four or more (preferably eight or more) rods permits a bicycle spoke type of arrangement to be employed whereby rotation of the drum 10 relative to the ring 50 is counteracted. In such an arrangement the rods do not lie in radial planes of the drum, but rather extend along vertical planes that do not intersect the vertical axis of the drum, with the planes of adjacent rods passing on opposite sides of the vertical axis of the drum. With larger vessels the number of rods may be increased accordingly in order to distribute the load, and it is contemplated that the number of rods may be on the order of twenty-four in an embodiment of the type shown in the drawing. Rods are the preferred form of link means because they provide little obstruction to the sides of the drum, thereby permitting access for construction and maintenance, providing free circulation of air, and avoiding accumulation of any spilled materials.

The rods 51 are held in place at each end by spherical ended nuts 52 which are, in turn, received in concave sockets in upper and lower support blocks 53 and 54 respectively. The upper support blocks 53 are mounted on the support ring 50 at an elevation above the center of gravity "C" of the loaded vessel in accordance with one aspect of the present invention. The lower support blocks 54 are affixed to a peripheral ring 55 or the like, which is attached to the drum 10 at an elevation substantially lower than the elevation of the upper support blocks 53. The extent to which the elevation at which the upper ends of the support rods 51 engage the support ring 50 exceeds the elevation of the center of gravity "C" is preferably maximized in order to optimize the self-centering affects. However, any significant elevation difference therebetween would achieve some degree of the self-centering advantage of the present invention. Practical consideration will, in most cases, restrict the elevation of the upper level of engagement. Structural support means for the stationary lid 11 and other appurtenances associated with the lid and the interface of the lid with the drum would typically interfere with any attempt to extend the rotating drum support elements above the uppermost elevation of the drum. Because the lining material 21 tapers to a greater thickness at the bottom of a cylindrical drum as shown in the drawing, the center of gravity will usually be within the lower half of the height of the drum. Accordingly, the elevation of support may alternatively be expressed as being at the upper half of the height of the drum.

Attachment of the link means such as rods 51 to the drum preferably is located at a region of the drum that is relatively cool and therefore less susceptible to thermal warpage. The thickening of the lining 21 toward the bottom of the cylindrical drum renders lower portions of the drum more desirable for the attachment locations. Although attachment at the upper half of the drum may sometimes be acceptable, it is preferred to make the attachment at the lower half. In the most preferred arrangement, the attachment is at or below the elevation of the center of gravity "C" of the vessel loaded with a normal amount of material including the lining.

The vessel 10, instead of the generally cylindrical shape shown may be provided with other shapes such as a downwardly converging frustoconical shape or a stepped shape as shown in U.S. Pat. No. 4,496,387 (Heithoff et al.). In such cases, the center of gravity may not lie within the lower half of the vessel, but the preferred elevation of support would be above the center of gravity, and the elevation of attachment to the vessel would be at the lower half.

The underside of the support ring 50 is provided with a tapered track 60 that makes rolling contact with a plurality of tapered wheels 61. The wheels 61 are rotatably carried by bearings 62 that are affixed to suitable stationary structural members such as beams 63. The wheels 61 carry the vertical load of the drum and its contents, and the number of wheels should be chosen accordingly to distribute the load, eight wheels being considered suitable in a typical commercial scale installation as shown in the drawing. The contact surface of the track 60 tapers downwardly toward the drum 10, thus being configured as a segment of a cone.

Lateral restraint is applied to the rotating drum 10 and support ring 50 by means of a plurality of wheels 70 bearing against the periphery of the support ring 50. The lateral restraint wheels 70 may be rotatably carried on rigid support means 71, which may be adjustable in the radial direction with respect to the drum 10. At least three lateral restraint wheels 70 are provided, preferably four, and the wheels 70 are preferably pneumatic tires. At least one of the wheels 70 is driven by means of a motor (not shown) so as to rotate the support table 50 and thus the drum 10. Rather than serving as absolute restraint for the rotating elements, the wheels 70 serve to dampen any oscillation or reciprocation of the drum axis from its intended locus. The wheels 70 damp any horizontal movement of the drum and support ring, while the conical interface between the track 60 and vertical support wheels 61 provides the primary centering force. Likewise, the decay of oscillatory motion of the drum axis by virtue of the support being at an elevation above the center of gravity is aided by the damping effect of the wheels 70.

It should be evident that other variations and modifications as would be known to those of skill in the art, may be resorted to without departing from the scope of the invention as defined by the claims which follow.

The invention has been described in connection with liquefaction of glass batch, for which the invention is particularly useful. This includes flat glass, fiber glass, container glass, sodium silicate, and virtually any type of specialty glass. The invention is also applicable to liquefying other materials such as metallurgical ores or other glassy or ceramic materials that may not be strictly defined as "glasses." It may also be noted that while the preferred practice is to employ compositions that are substantially identical chemically for the throughput batch and the liquefying vessel pulverulent lining, particularly when processing flat glass, some variation therebetween can be considered non-contaminating and thus unobjectionable in some cases.

We claim:

1. A method of liquefying thermally fusible material comprising:

feeding pulverulent batch material to a cavity encircled by a lining of pulverulent material on interior side wall portions of a vessel;

providing heat to the cavity at a rate to partially liquefy exposed portions of the pulverulent material, and permitting the partially liquefied material to flow from the vessel;

protecting a major portion of the vessel side wall against undue thermal deterioration primarily by maintaining sufficient pulverulent lining thickness to insulate that portion of the vessel from the heat within the cavity, the pulverulent lining thickness being maintained by controlling the rate of heating and the rate of feeding additional pulverulent material and permitting liquefied material to drain from the lining; and at a minor portion of the vessel side wall where pulverulent lining thickness is relatively less than at the major portion such that it is not sufficient to adequately insulate the vessel, preserving the minor portion of the vessel by providing a refractory lining on corresponding interior portions of the vessel.

2. The method of claim 1 wherein the preserving of the minor portions includes directing coolant into contact with the exterior surface of the side wall portions.

3. The method of claim 1 wherein the minor portion preserved by the refractory lining is at the upper end of the vessel.

4. The method of claim 1 wherein the thickness of the pulverulent lining in the minor portion is subsequently increased.

5. The method of claim 2 wherein the cooling of side wall portions includes directing a stream of coolant fluid toward the exterior surface of the side wall.

6. The method of claim 1 wherein the material being liquefied comprises glass batch materials and the pulverulent lining comprises glass batch materials.

7. The method of claim 1 wherein the vessel is rotated about a substantially vertical axis, the pulverulent material is fed at the upper end of the vessel, the liquefied material is drained at the bottom portion of the vessel, and the pulverulent lining tapers to a relatively thin portion at the upper end of the vessel.

8. Apparatus for liquefying thermally fusible material comprising:

a vessel having side walls and a bottom mounted for rotation about a substantially vertical axis, means for feeding pulverulent material into the vessel, outlet means for draining liquefied material from the vessel, the configuration of the vessel being such that a layer of the pulverulent material forms on the interior walls of the vessel tapering from a relatively thin upper portion to a relatively thick lower portion, and a partial lining of refractory on side wall portions of the vessel in at least areas where the pulverulent layer is relatively thin.

9. The apparatus of claim 8 further including cooling means for spraying liquid coolant against exterior surface portions of the side walls.

10. The apparatus of claim 8 wherein the refractory lining is associated with only an upper portion of the vessel side walls.

11. A method of liquefying thermally fusible material comprising:

feeding pulverulent batch material to a cavity encircled by a lining of pulverulent material on interior side wall portions of a vessel;

providing heat to the cavity at a rate to partially liquefy exposed portions of the pulverulent material, and permitting the partially liquefied material to flow from the vessel;

protecting side wall portions of the vessel against undue thermal deterioration during major operating time periods primarily by maintaining sufficient pulverulent lining thickness to insulate the side wall portion from heat within the cavity, the pulverulent lining thickness being maintained by controlling the rate of heating and the rate of feeding additional pulverulent material and permitting liquefied material to drain from the lining; and providing a refractory lining on interior portions of the vessel beneath at least portions of the pulverulent lining, whereby vessel wall portions in areas where the pulverulent lining is relatively thin are shielded from heat within the cavity upon aberrant reduction of pulverulent lining thickness.

12. The method of claim 11 further including directing coolant into contact with the exterior surface of the side wall portions.

13. The method of claim 11 wherein the cavity is substantially symmetrical about a vertical axis and the vessel wall portions subject to aberrant reduction of pulverulent lining thickness are at the upper end of the vessel.

14. The method of claim 11 wherein the thickness of the pulverulent lining following aberrant reduction is subsequently increased.

15. The method of claim 11 wherein the material being liquefied comprises glass batch material and the pulverulent lining comprises glass batch material.

16. The method of claim 11 wherein the vessel is rotated about a substantially vertical axis, the pulverulent material is fed at the upper end of the vessel, the liquefied material is drained at the bottom portion of the vessel, and the pulverulent lining tapers to a relatively thin portion at the upper end of the vessel.

* * * * *